Nov. 2, 1948.                H. C. PRICE ET AL                2,452,867
                    HYDRAULIC INTERNAL LINE-UP CLAMP
Filed July 12, 1945                                    3 Sheets-Sheet 1

INVENTOR
H. C. PRICE
B. V. ELLIOTT
BY
ATTORNEY

Nov. 2, 1948.  H. C. PRICE ET AL  2,452,867
HYDRAULIC INTERNAL LINE-UP CLAMP
Filed July 12, 1945  3 Sheets-Sheet 2
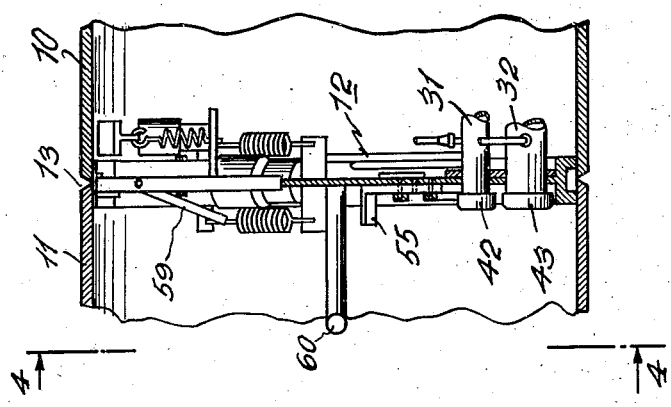
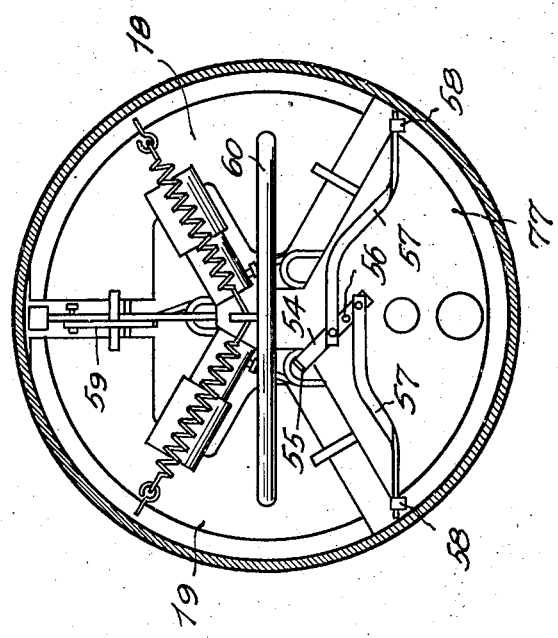
INVENTOR
H. C. PRICE
BY B. V. ELLIOTT
ATTORNEY Nov. 2, 1948. H. C. PRICE ET AL 2,452,867
HYDRAULIC INTERNAL LINE-UP CLAMP
Filed July 12, 1945 3 Sheets-Sheet 3
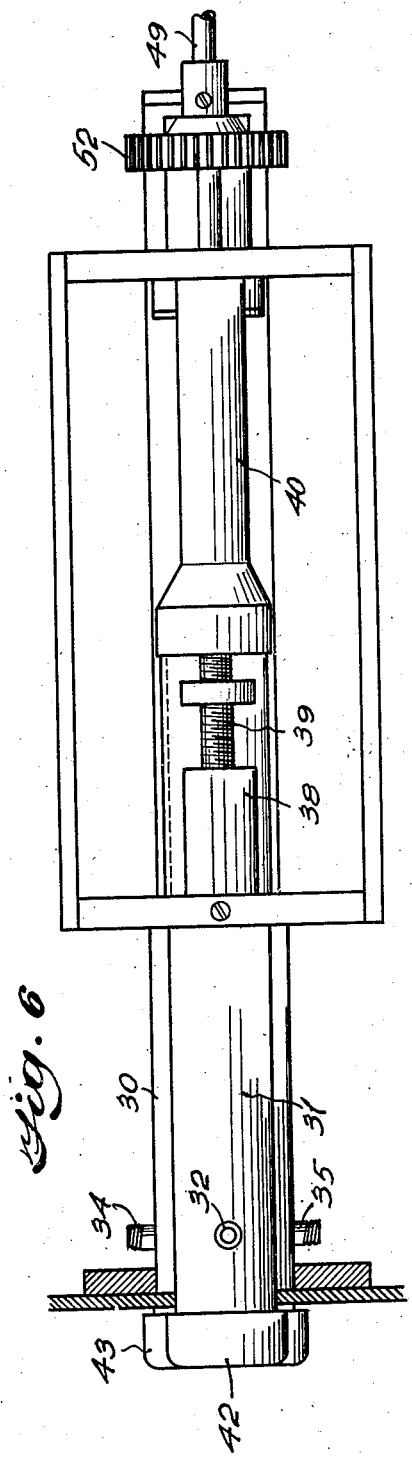
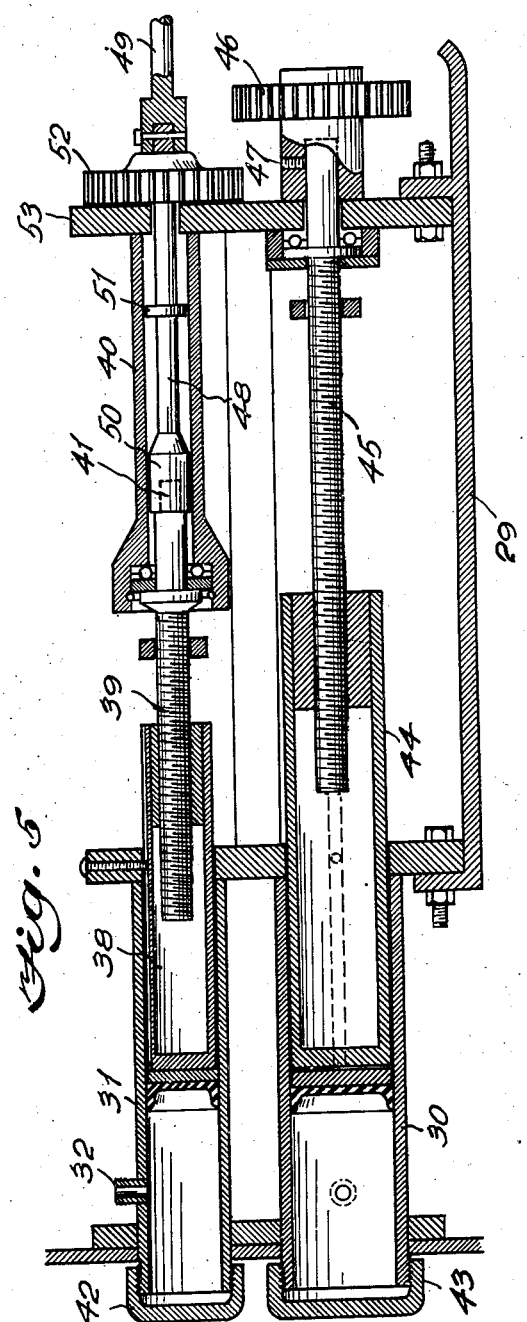
INVENTOR
H. C. PRICE
B. V. ELLIOTT
ATTORNEY Patented Nov. 2, 1948

2,452,867

UNITED STATES PATENT OFFICE 2,452,867

HYDRAULIC INTERNAL LINE-UP CLAMP

Harold C. Price and Bernard V. Elliott, Bartlesville, Okla., assignors, by mesne assignments, to H. C. Price Co., Bartlesville, Okla., a corporation of California Application July 12, 1945, Serial No. 604,586

2 Claims. (Cl. 113—103)

The present invention relates to means used in pipe welding operations wherein pipe sections are butt welded, and more particularly to an internal clamp for lining up the pipe sections prior to the welding operation. The present invention constitutes an improvement over our co-pending application for Hydraulic internal line-up clamp, Serial No. 553,948, filed September 13, 1944 which has issued into Patent Number 2,408,255.

In our co-pending application referred to above, we have described a line-up clamp having a hydraulically operated split clamping ring and a similarly operated jack associated therewith, the jack serving to support the ring for the clamping operation. The present device operates in the same general manner as described above, but presents numerous structural improvements resulting in a more simplified construction, a device easier to operate, and one that is more positive in its primary function of lining up the two ends of adjacent pipes to be butt welded.

The present invention, in addition to improving numerous details of construction disclosed in our prior application, presents novel means for properly positioning the line-up clamp with respect to the end of a pipe section to be welded.

The numerous advantages of the present invention will be readily apparent from the following detailed description taken in conjunction with the accompanying drawings wherein:

Figure 3 is a side elevational view of the clamp positioned within a pair of abutting pipe sections, shown in section in position to be welded, the expanding ring being shown in its expanded position;

Figure 4 is a front elevational view of the clamp taken on the line 4—4 of Figure 3;

Figure 5 is a longitudinal sectional view of the hydraulic pump; and

Figure 6 is a plan view thereof.

Figure 1:
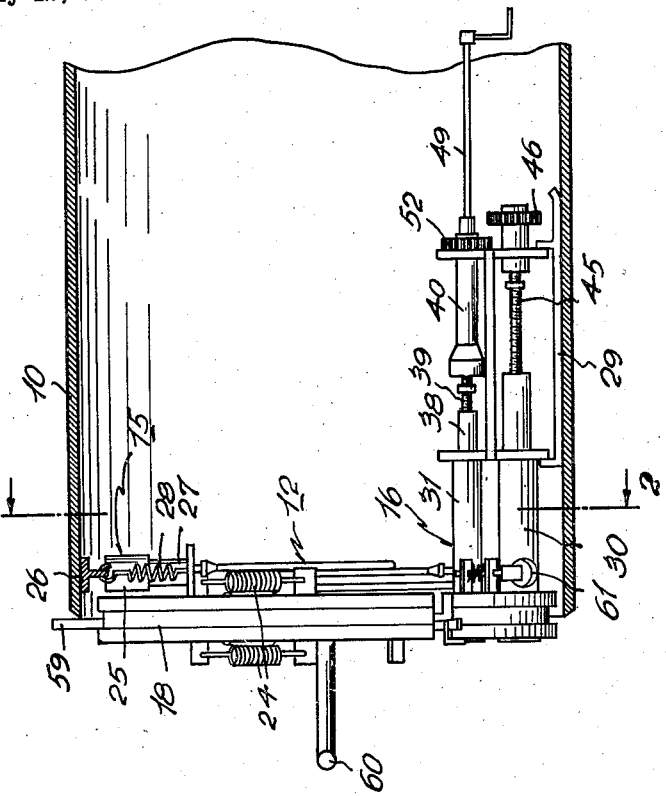
Figure 1 is a side elevational view of the novel line-up clamp forming the subject matter of the present invention, positioned at one end of a pipe section shown in longitudinal section, with the expanding ring shown in retracted position.

Referring to the drawings in detail wherein like reference numerals refer to like parts throughout the several views, numerals 10 and 11 designate a pair of abutting pipe sections adapted to be aligned and held in position by the novel internal clamp 12 forming the subject matter of the present invention, whereby a peripheral weld may be applied at 13 to unite said pipe sections.

Figure 2:
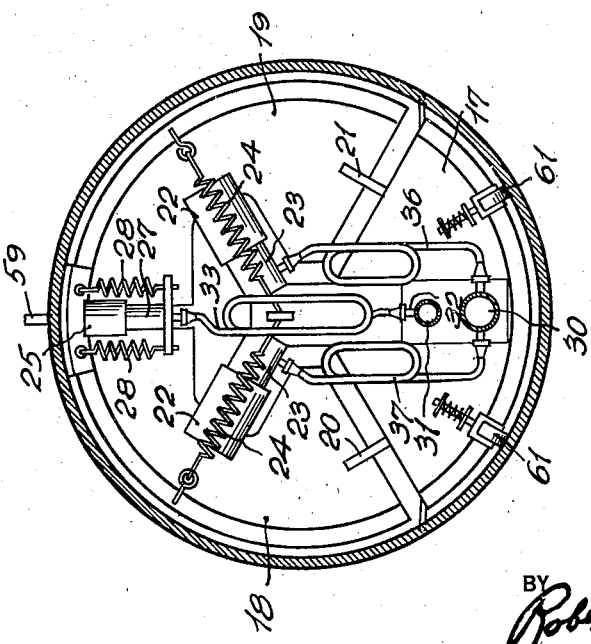
Figure 2 is a sectional view taken on the line 2—2 of Figure 1.

The clamp 12 comprises a split clamping ring 14, a jack 15 and the operating mechanism 16. Referring to Figure 2, the split clamping ring 14 is made up of three disc sections 17, 18 and 19. Section 17 carries the operating mechanism 16 and is immovable with respect to the pipe sections after the clamp is in final position. A pair of stationary guide members 20 and 21 are mounted on the lower section 17 and cooperate with guide portions formed in the movable disc sections 18 and 19. Each of the sections 18 and 19 have fastened thereto a cylinder 22, cooperating with a piston 23 mounted on the stationary disc 17. A plurality of spring members 24 secured to sections 17, 18 and 19 on opposite sides of said sections serve to retract the clamping ring upon release of the operating mechanism. The above structure is substantially the same as the structure described in our co-pending application and forms no part of the present concept.

The jack 15 of the present invention is provided with a reciprocating cylinder 25 terminating in a head 26 adapted to engage the upper surface of the pipe. A stationary piston 27 for reciprocating the cylinder is mounted on the clamping member. A pair of spring members 28 serve to retract the cylinder upon release of the operating medium.

Referring to Figures 5 and 6, the operating mechanism 16 is in the form of an hydraulic pump mounted on a supporting frame 29, resting on the bottom of pipe section 10. The pump consists of a pair of cylinders 30 and 31 mounted above each other, the lower cylinder supplying the fluid for operating the expanding sections of the split ring and the upper cylinder supplying the fluid for operating the jack. The upper cylinder is provided with a nipple 32 to which a line 33 is connected to piston 27, as seen in Figure 2. Cylinder 30 is provided with a pair of nipples 34 and 35, to which lines 36 and 37 are connected for supplying fluid to pistons 23.

As seen in Figure 5, a piston 38 is slidably mounted in cylinder 31 and is reciprocated by a threaded shaft 39 mounted in housing 40 secured to the frame. The outer end of the shaft 39 is provided with a square portion 41 for a purpose to be described. The outer end of cylinder 31 is provided with a removable threaded cap member 42 which can be removed to supply the cylinder with fluid.

The lower cylinder 30 is also provided with a threaded cap member 43 for supplying fluid to said cylinder. It will be noted that the outer ends of cylinders 30 and 31 extend through the stationary plate 17 resulting in a more rigid construction. Cylinder 30 is provided with a reciprocating piston 44 operated by a threaded shaft 45, the outer end of which extends through the frame 29 and has a gear member 46 secured thereto by means of a screw 47.

The operating mechanism consists of a shaft 48 having a handle 49 at one end and a socket portion 50 at the other end thereof. A stop member 51 is mounted on the shaft 48 within the housing 40 and a gear 52 mounted on the shaft lying outside the housing 40. The stop 51 and the gear 52 are so mounted with respect to the shaft 48 that when the shaft is moved to the right until the stop 51 engages the vertical wall 53, the end 41 of shaft 39 will be disengaged from the socket 50 and the gear 52 will mesh with gear 46.

Thus it will be seen that a simplified arrangement has been provided whereby a single handle may selectively operate either cylinder. In the forward position of the shaft 48, rotation of the handle 49 will rotate shaft 39, moving piston 38 forward, thereby supplying fluid to line 33, causing the jack to bear against the pipe section to hold the clamp in position for further operation. The shaft 48 is then moved rearwardly until the stop 51 strikes the wall member 53. In this position, rotation of the handle will move piston 44, thereby supplying fluid to lines 36 and 37, causing the disc sections 18 and 19 to move outwardly into contact with the inner surface of the pipe section. In order to enable easy manipulation and insertion of the mechanism within the pipe, rollers 61 are mounted on the disc section 17.

Thus it will be seen that the construction herein shown and described is well adapted to accomplish the objects of the invention. It will be understood, however, that the invention may be embodied otherwise than here shown and that in the form illustrated, certain minor changes may be made without departing from the spirit of the invention. Therefore, we do not wish to be limited precisely to the construction herein shown except as may be required by the appended claims considered with reference to the prior art.

What we claim and desire to secure by Letters Patent is:

1. An internal line-up clamp comprising a supporting frame member, a stationary ring section rigidly mounted on said frame member, a movable ring section carried by said stationary ring section, hydraulic means on said stationary ring section for moving said movable ring section outwardly, a hydraulic jack carried by said frame member, a pump mounted on said frame member, said pump comprising a fluid cylinder connected to the jack hydraulic means, a second fluid cylinder connected to the ring section hydraulic means, a piston within each of the cylinders, a threaded shaft mounted on each piston, and a longitudinally movable shaft carried by said frame, said shaft being movable inwardly to engage and operate one of said threaded shafts, and movable outwardly to engage and operate the other of said threaded shafts.

2. An internal line-up clamp comprising a supporting frame member, a stationary ring section rigidly mounted on said frame member, a movable ring section carried by said stationary ring section, hydraulic means on said stationary ring section for moving said movable ring section outwardly, a hydraulic jack carried by said frame member, a pump mounted on said frame member, said pump comprising a fluid cylinder connected to the jack hydraulic means, a second fluid cylinder connected to the ring section hydraulic means, a piston within each of the cylinders, a threaded shaft mounted on each piston, a longitudinally movable shaft carried by said frame, said shaft being movable inwardly to engage and operate one of said threaded shafts, and movable outwardly to engage and operate the other of said threaded shafts, and means carried by said longitudinally movable shaft to properly position said shaft with respect to each of the threaded shafts.

HAROLD C. PRICE.
BERNARD V. ELLIOTT.

REFERENCES CITED

The following references are of record in the file of this patent:

UNITED STATES PATENTS

| Number | Name | Date |
|---|---|---|
| 1,623,405 | Gocke et al. | Apr. 5, 1927 |
| 1,642,825 | Pearce | Sept. 20, 1927 |
| 1,980,419 | Martin et al. | Nov. 13, 1934 |
| 2,035,328 | McCollum | Mar. 24, 1936 |
| 2,408,255 | Elliott et al. | Sept. 24, 1946 |